United States Patent
Nelson (10) Patent No.: US 12,236,257 B2
(45) Date of Patent: Feb. 25, 2025

(54) AUTOMATIC SHUTDOWN OF IDLE VIRTUAL MACHINES

(71) Applicant: Microsoft Technology Licensing, LLC, Redmond, WA (US)

(72) Inventor: Jason Nelson, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 441 days.

(21) Appl. No.: 17/678,239

(22) Filed: Feb. 23, 2022

(65) Prior Publication Data

US 2023/0266987 A1     Aug. 24, 2023

(51) Int. Cl.
*G06F 9/455*     (2018.01)
*G06F 9/48*     (2006.01)
*G06F 9/50*     (2006.01)

(52) U.S. Cl.
CPC .......... *G06F 9/45558* (2013.01); *G06F 2009/45562* (2013.01); *G06F 2009/45575* (2013.01); *G06F 2009/45591* (2013.01); *G06F 9/485* (2013.01); *G06F 9/5022* (2013.01)

(58) Field of Classification Search
None
See application file for complete search history.

(56) References Cited

U.S. PATENT DOCUMENTS 11,188,439 B2   11/2021   Gopisetti et al.
2021/0064388 A1*   3/2021   Gardner .............. G06F 11/3055

FOREIGN PATENT DOCUMENTS

WO    2016176281 A1    11/2016

OTHER PUBLICATIONS

"International Search Report and Written Opinion Issued in PCT Application No. PCT/US22/050984", Mailed Date: Apr. 24, 2023, 10 Pages.

* cited by examiner

*Primary Examiner* — Bing Zhao
(74) *Attorney, Agent, or Firm* — Schwegman Lundberg & Woessner, P.A.

(57) ABSTRACT

Methods, systems, and computer programs are presented for automatically shutting down idle virtual machines (VMs). One method includes an operation for determining a number of active connections of a VM. The method further includes checking disconnect rules to determine automatic shutting down of the VM. The disconnect rules are based on the number of active connections of the VM, and the disconnect rules define criteria for determining when to shut down the VM automatically. The method further includes, based on determining to automatically shut down the VM, sending a message indicating the VM is inactive to a VM manager program executing at a cloud-service provider. The VM manager program is configured to shut down the VM in response to receiving the message indicating the VM is inactive.

20 Claims, 8 Drawing Sheets

AUTOMATIC SHUTDOWN OF IDLE VIRTUAL MACHINES

TECHNICAL FIELD

The subject matter disclosed herein generally relates to methods, systems, and machine-readable storage media for the management of virtual machines.

BACKGROUND

Virtual machines (VMs) are an excellent tool for providing inexpensive computing capabilities. Typically, a user pays for VMs based on use, e.g., paying by each hour that the VM is up and running, as the active VM consumes power and computing resources.

To save money, some VM service providers include options to shut down VMs based on CPU usage. However, this approach fails sometimes as the VM may be doing some background activities (e.g., preloading web pages, checking email) but there is no user actually using the VM. This results in the VM continuing to execute and increasing the cost of having the VM doing non-essential activities.

Further, the VM service provider may suffer periods of high demand, that may require expensive solutions, e.g., having to increase computing resources and add new data centers.

Thus, management of inactive VMs is a benefit for both the user and the VM service provider.

BRIEF DESCRIPTION OF THE DRAWINGS

Various of the appended drawings merely illustrate example embodiments of the present disclosure and cannot be considered as limiting its scope.

DETAILED DESCRIPTION

Example methods, systems, and computer programs are directed to automatically shutting down idle virtual machines (VMs), Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In one aspect, the state of a VM is monitored and if the VM is inactive, the VM is automatically shut down without requiring a user command to shut down the VM. In some cases, the number of active connections in the VM is monitored, and if the number of active connections is below a certain threshold for a minimum amount of time, then the VM is shut down. In some cases, the VM is kept active if there is a single connection, but other thresholds may be configured. In some cases, a notification message is sent from a connection-monitor program at the VM to a cloud service that provides the VMs. The cloud service will shut down the VM based on configurable shutdown rules.

One general aspect includes a method that includes an operation for determining a number of active connections of a virtual machine (VM). The method further includes checking disconnect rules to determine automatic shutting down of the VM. The disconnect rules are based on the number of active connections of the VM, and the disconnect rules define criteria, for determining when to shut down the VM automatically. The method further includes, based on determining to automatically shut down the VM, sending a message indicating the VM is inactive to a VM manager program executing at a cloud-service provider. The VM manager program is configured to shut down the VM in response to receiving the message indicating the VM is inactive.

One general aspect includes a method that includes an operation for determining, by a cloud-service server, a number of terminal-services connections of a virtual machine (VM) executing on the cloud-service server. Further, the method includes checking, by the cloud-service server, disconnect rules to determine automatic shutting down of the VM. The disconnect rules are based on the number of terminal-services connections of the VM, and the disconnect rules defining criteria for determining when to shut down the VM automatically. Further, the method includes shutting down the VM in response to automatically shut down the VM.

Figure 1:
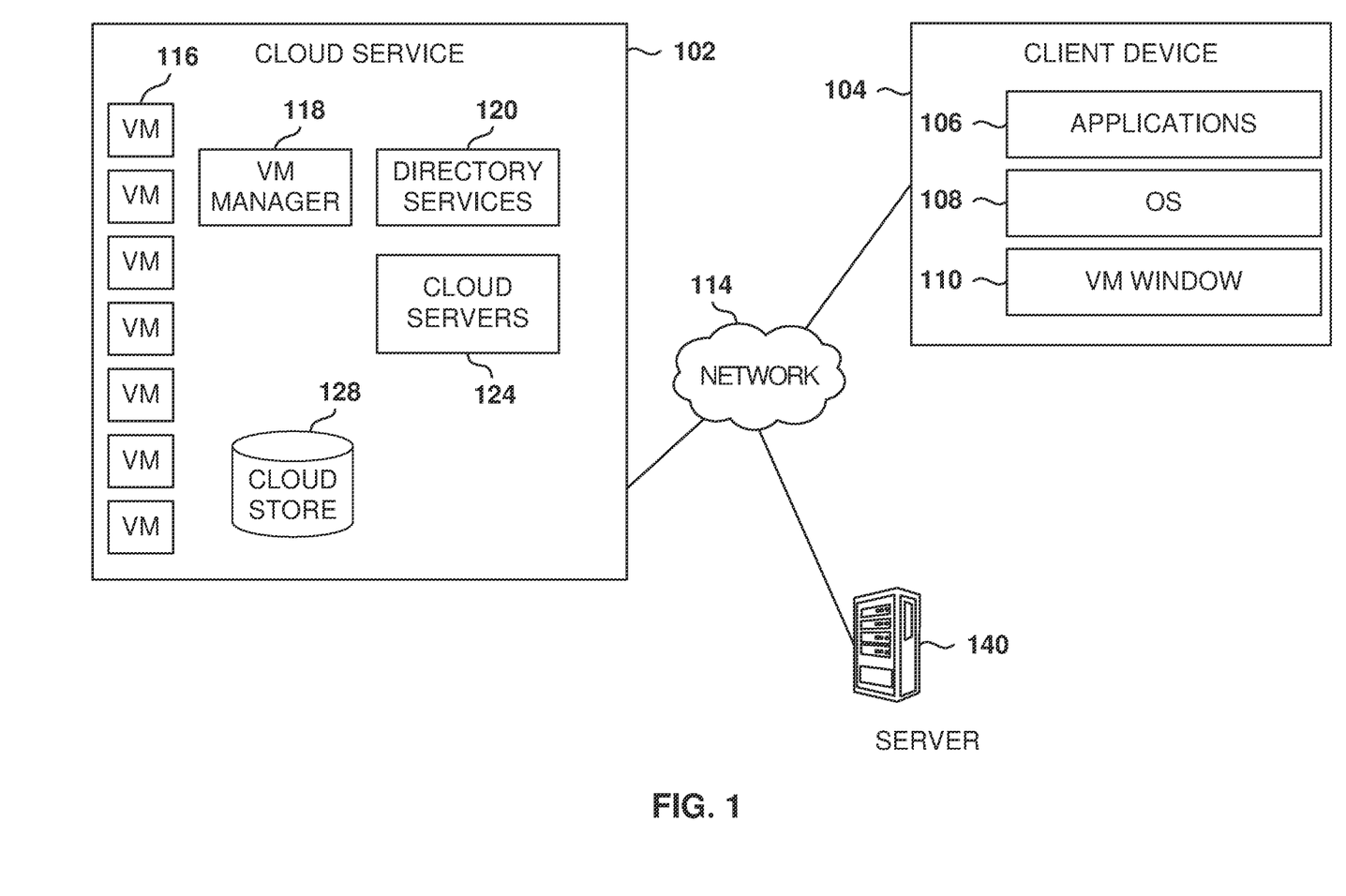
FIG. 1 is a simplified diagram of a computer environment for deployment of virtual machines (VMs), according to some example embodiments.

FIG. 1 is a simplified diagram of a computer environment for deployment of virtual machines (VMs), according to some example embodiments. A cloud-service server 102 provides multiple services, including the deployment of a plurality of VMs 116. Although a single cloud-service server 102 is presented, the services may be provided by a plurality of servers in a distributed fashion.

One example of a VM provider is Azure™ from Microsoft™ to provision Windows™ or Linux™ VMs. Some of the embodiments are presented with reference to Azure, but the same principles may be used for other VM services.

A client device 104 may be used to access the cloud-service server 102 via a network 114 such as the Internet. The client device 104 includes an operating system (OS) 108 to enable executing applications 106 on the client device 104. If the client device 104 provisions a. VM 116 on the cloud-service server 102, the VM 116 may be access through terminal services, which includes a VM window 110 on client device 104 that provides a user interface that represents the user interface that the VM machine 116 would provide.

Terminal Services, also known as Remote Desktop Services in Windows Server, is a component of Microsoft Windows that allows a user to access applications and data on a remote computer over a network. Windows applications, or the entire desktop of the computer running Terminal Services, are made accessible to a remote client device 104, such as at VM window 110. With terminal services, the user interface of an application is presented at the client. Any input to it is redirected over the network to the server, where application execution takes place.

The cloud-service server 102 further includes a VM manager 118, directory services 120, one or more cloud servers 124, and cloud store 128. The VM manager is responsible for configuring, provisioning, managing, monitoring, and de-provisioning the VMs 116. Directory services 120 implement the Azure Active Directory (Azure AD) enterprise identity service that provides user management, single sign-on, multi-factor authentication, and other directory-related services.

One or more cloud servers 124 provide the computing resources for implementing the services of the cloud service. Further, cloud store 128 allows user to store data on the cloud. The data in the cloud store 128 may also be configured to be accessed by the VMs 116. The client device 104 as well as the VMs 116 may access other servers 140 via the network 114.

Often, users would like to deallocate VMs 116, also referred to as shut down or deprovision, when the VMs 116 are not in use so they can save money. Another benefit of shutting down VM 116 is improved security because a VM that is not executing may not be targeted by malicious users.

However, automatically shutting down idle VMs may be difficult because it is difficult to assess if a VM is really idle. For example, if network activity is used to determine if the VM is idle, the VM may have no remote-desktop connections (e.g., the remote desktop application on the client device has shut down), but the VM may still be performing network activities, such as a webpage on a browser that updates information periodically, an email client that periodically checks for new mail, active connection to application servers, etc. Thus, the VM may appear active, but for a user, the VM may be considered idle because the remote-desktop connection has been shut down.

Additionally, sometimes it may appear that the VM is idle, but the VM may be performing valuable work. For example, a developer may be building an application server on the VM, an operation that may take several hours. Once the developer initiates the operation to build the application server, the developer may close the remote desktop (e.g., the client device is a laptop that is put to sleep because of an inactivity timer), but the developer does not want the VM to shut down. Thus, shutting down the VM automatically would be a detrimental operation to the user.

In one aspect, a flexible system is presented for automatically shutting down VMs. The system is configurable to accommodate multiple scenarios for shutting down the VM, exempting VMs from shutting down, automatically shutting down if the remote desktop is closed, providing timers to shut down after the VM is idle for a minimum amount of time, configuring the parameters that define when the VM is considered idle, etc.

Further, a connect monitor program installed in the VM is able to determine when the VM is idle. The connect monitor interacts with the cloud service server that executes the VM to automatically shut down the VM. Further, the cloud service server has configurable disconnect parameters for validating if the VM should be shut down.

Figure 2:
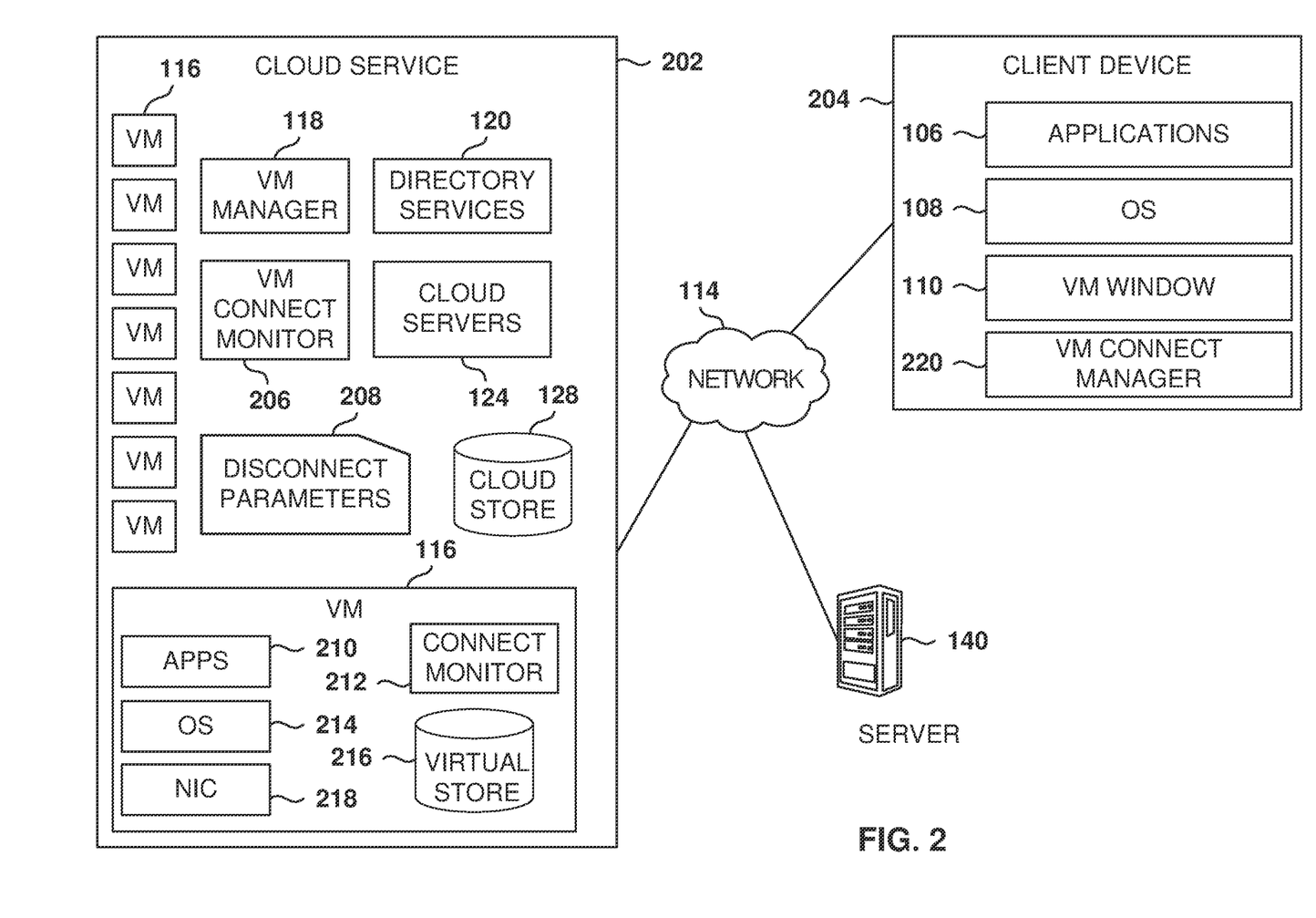
FIG. 2 is diagram of a computer environment with programmable logic for managing the automatic shutdown of idle VMs, according to some example embodiments.

FIG. 2 is diagram of a computer environment with programmable logic for managing the automatic shutdown of idle VMs, according to some example embodiments. The cloud-service server 202 includes additional programs to monitor and shut down VMs when the VMs are not in use.

The cloud-service server 202 includes the same modules as the cloud-service server 102 described with reference to FIG. 1, plus a VM connect monitor 206. Additionally, one or more VMs 116 include a connect monitor 212 to determine when the VM is idle. The VMs further include an OS 212, executing applications 210, a network interface card (MC) 218 to communicate via a virtual network, and virtual store 216 for storing the data of the VM 116.

The connect monitor 212 examines the activity in the VM to determine when the VM is a candidate for shutting down. More details about the connect monitor 212 are provided below with reference to FIG. 3. When the connect monitor 212 detects a condition for shutting down the VM, the connect monitor 212 sends a message, referred to herein as an idle-VM message, to the VM connect monitor 206 to notify that the VM 116 is a candidate for shutting down.

In some example embodiments, the idle-VM message is sent via an HTTP POST, but any other type of inter-process messaging method may be used. AN HTTP POST is a method used for sending data to the server from an HTTP client, and the HTTP POST requests the web server accept the data enclosed in the body of the message. For example, HTTP POSTs are often used when submitting login or contact forms or uploading files and images to the server.

When the VM connect monitor 206 receives the idle-VM message, the VM connect monitor 206 checks configurable shutdown logic, referred to herein as disconnect parameters 208, to determine if the VM will be shut down. More details on the disconnect logic for the VM connect monitor 206 are provided below with reference to FIG. 5.

Figure 3:
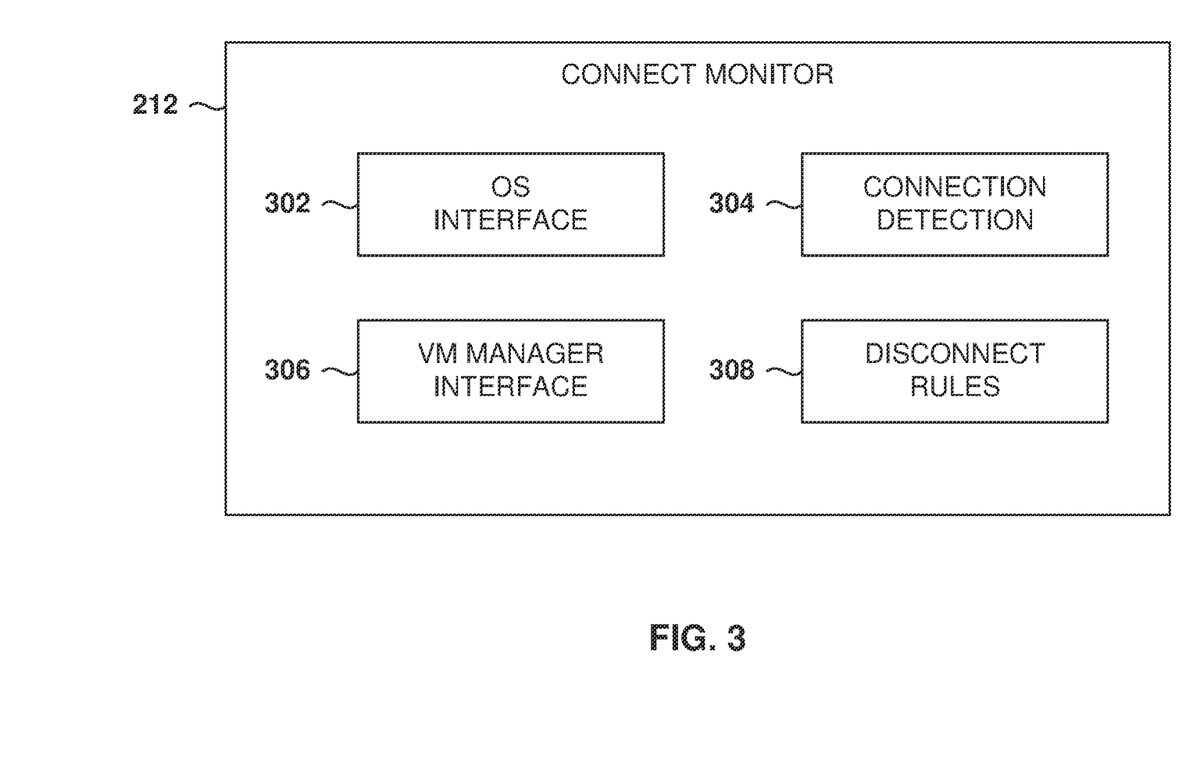
FIG. 3 is a sample architecture for the implementation of the connect monitor, according to some example embodiments.

The client device 204 includes the same elements as the client device 104 of FIG. 1 plus a VM connect manager 220 used for configuring the disconnect parameters 208 and the disconnect rules used by the connect monitor 212. In some example embodiments, a user interface (UI) is presented by the VM connect manager to be able to do the configuration. The UI may be presented by the cloud-service server 202 or the connect monitor, FIG. 3 is a sample architecture for the implementation of the connect monitor, according to some example embodiments. The connect monitor 212 includes an OS interface 302, a connection-detection program 304, a VM manager interface 306, and one or more disconnect rules 308.

The OS interface 302 provides the interaction with the OS 214 executing on the VM. For example, the OS interface 302 gathers information regarding active processes and active connections in the VM. For example, the OS interface 302 may make a call via the Win 32 API to obtain information about the terminal service connections, which includes the number of active terminal connections.

The connection-detection program 304 determines if there are active connections in the VM based on the information obtained from the OS. If the number of connections is below a predetermined threshold (e.g., below 1 connection, which means no active connections), then the connection-detection program 304 notifies the cloud-service server 202 via the VM manager interface 306.

The VM manager interface 306 interacts with the VM connect monitor 206 at the cloud-service server 202 to send the idle-VM message for shutting down the VM. As discussed above, the idle-VM message may be an HTTP POST, Additionally, the VM manager interface 306 may respond to requests for information (e.g., number of active connections) (e.g., from the VM connect monitor 206 at the cloud-service server 202) to give information on the number of active connections, and optionally, other information, such as how long the connections have been active, or some other statistical data related to connections.

The connection-detection program 304 utilizes the disconnect rules, which define the criteria for when to shut down the VM. As used herein, a connection is an ongoing interaction between the VM and another device, real or virtual, to exchange data. For example, a connection may be a TCP/IP network connection to the server. One example disconnect rules is, "disconnect the VM when the number of terminal-services connections is zero."

The most common type of connection for the VM is a terminal-service connection, but there may be other types of connections, such as connections to email servers, application servers, web servers, etc. The type of connection considered for determining if the VM is idle is configurable and defined in the disconnect rules 308. For example, an email client that checks periodically for new mail in an email server, may not be configured to be an active connection, or these types of connections will be ignored to determine if the VM is idle. In a majority of cases, it is expected that the number of terminal-services connections will be the main factor for determining if the VM is idle, but other connection types may also be configured.

Additionally, a time threshold may be configured so the VM will not be shut down until the VM has been without active connections for a period exceeding the time threshold. For example, a developer may be working on migrating a portion of Microsoft Exchange, a process that may take a few hours. The developer will not want to shut down the VM during this time, so the time threshold may be set to 24 hours, so the VM is not shut down during the process.

Additionally, the disconnect rules 308 may be configured for some VMs, but other VMs may be configured to not be shut down and be exempt for the inactivity test.

Further, the disconnect rules 308 may also include time windows. A first time window may be defined to shut down the VM automatically. For example, the VM will be allowed to execute during working hours between 9 AM and 5 PM. A second time window may be defined to make sure the VM is not shut down during that period. For example, the VM will not be shut down between 9 AM and 10 AM, which is the time when the user tends to start using the VM. This will avoid the inconvenience to the user that does not want to have to login to the VM multiple times.

It is noted that the embodiments illustrated in FIG. 3 are examples and do not describe every possible embodiment. Other embodiments may utilize different modules or combine the functionality of several modules. The embodiments illustrated in FIG. 3 should therefore not be interpreted to be exclusive or limiting, but rather illustrative.

Figure 4:
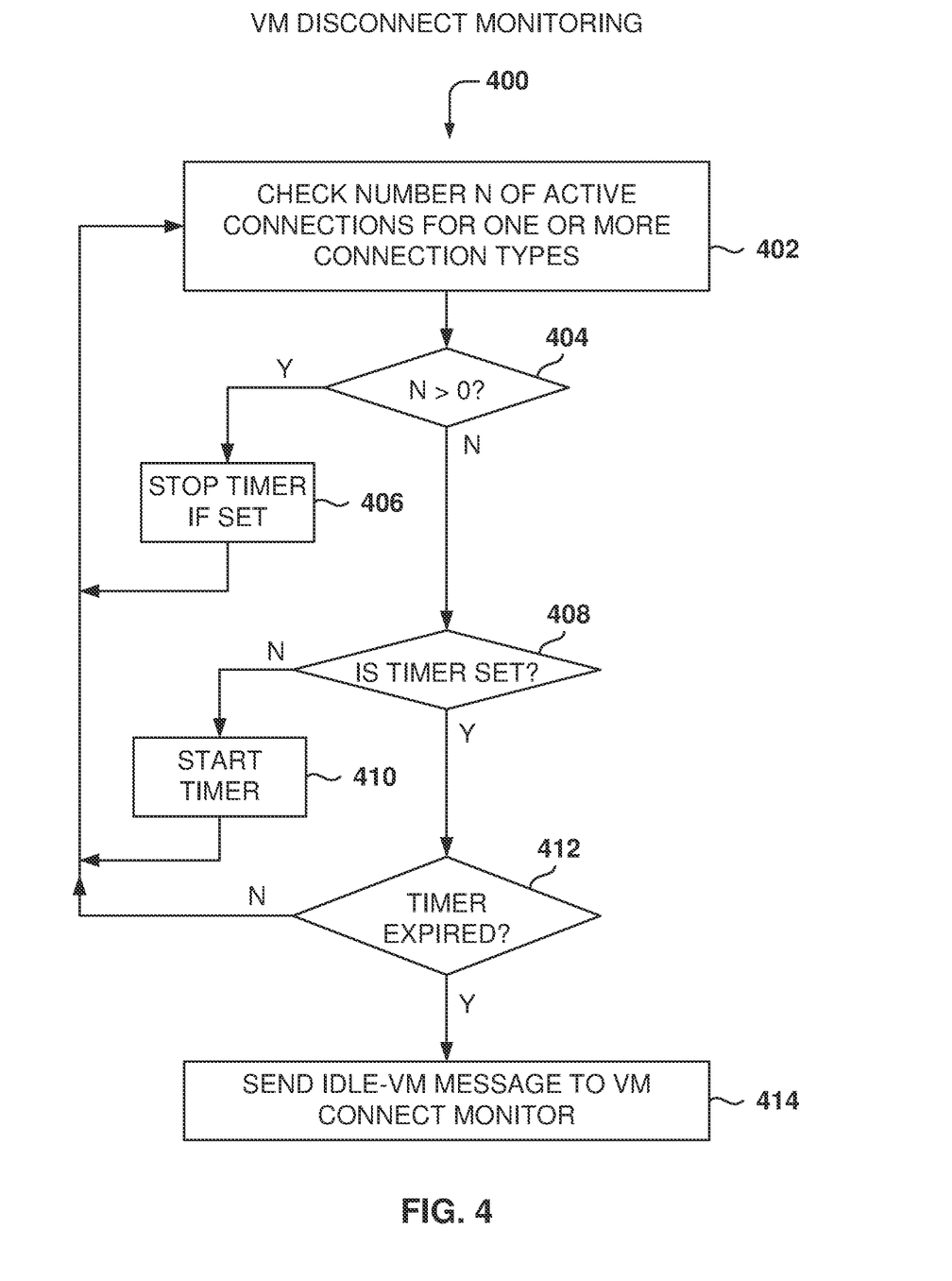
FIG. 4 is a flowchart of a method for monitoring if a VM has active connections, according to some example embodiments.

FIG. 4 is a flowchart of a method 400 for monitoring if a VM has active connections, according to some example embodiments. At operation 402, the number of active connections is checked, for one or more type of connections. A typical connection is a terminal-services connection, but other types of connections may be included.

At operation 402, a check is made for the number n of active connections for one or more connection types. For example, by requesting, via API from the OS, the number of active terminal connections.

From operation 402, the method 400 flows to operation 404, where a check is made to determine if ii is greater than zero. If n is greater than zero, the method 400 flows two operation 406, and if n is less than or equal to zero the method 400 flows to operation 408. In other embodiments, the threshold may be more than zero, such as 1, 5, 10, etc. That is, if the VM has one active connection, the VM will be shut down also.

At operation 406, if a timer has been set, the timer is stopped because there is more than one active connection. In other embodiments, the timer is not used and the VM will be shut down once the number of connections is zero, without further wait. From operation 406, the method 400 flows back to operation 402.

At operation 408, a check is made to determine if the timer has been set. If the timer and has been set, the method 400 flows to operation 412, and if the timer has not been set, the method flows to operation 410 where the timer is started, and the method flows back to operation 402.

At operation 412, a check is made to determine if the tinier has expired. If the timer has expired, the method 400 flows to operation 414 where the send idle-VM message is sent to the VM connect monitor. If the timer has not expired, the method 400 flows back to operation 402.

It is noted that other embodiments may not use a timer and keep track of the time the VM has been without connections in a different way, such as logging when connections are brought up or shut down. The embodiment illustrated in FIG. 4 should therefore not be interpreted to be exclusive or limiting, but rather illustrative.

It is noted that the process for determining when to shut down the VM is configurable. The configurable options may include one or more of:

Threshold number of terminal connections before shutting down the VM;

Threshold number of SMTP connections before shutting down the VM;

Threshold number of web browser tabs open before shutting down the VM;

Minimum amount of time the VM is inactive before shutting down the VM;

VM exempt from being shut down based on the VM being inactive;

VM to be shut down automatically without requiring approval of the VM service provider; and VM service provider makes ultimate determination of when to shut down VM.

Additionally, other types of connections may be considered, such as connections to servers (e.g., cloud file system).

Figure 5:
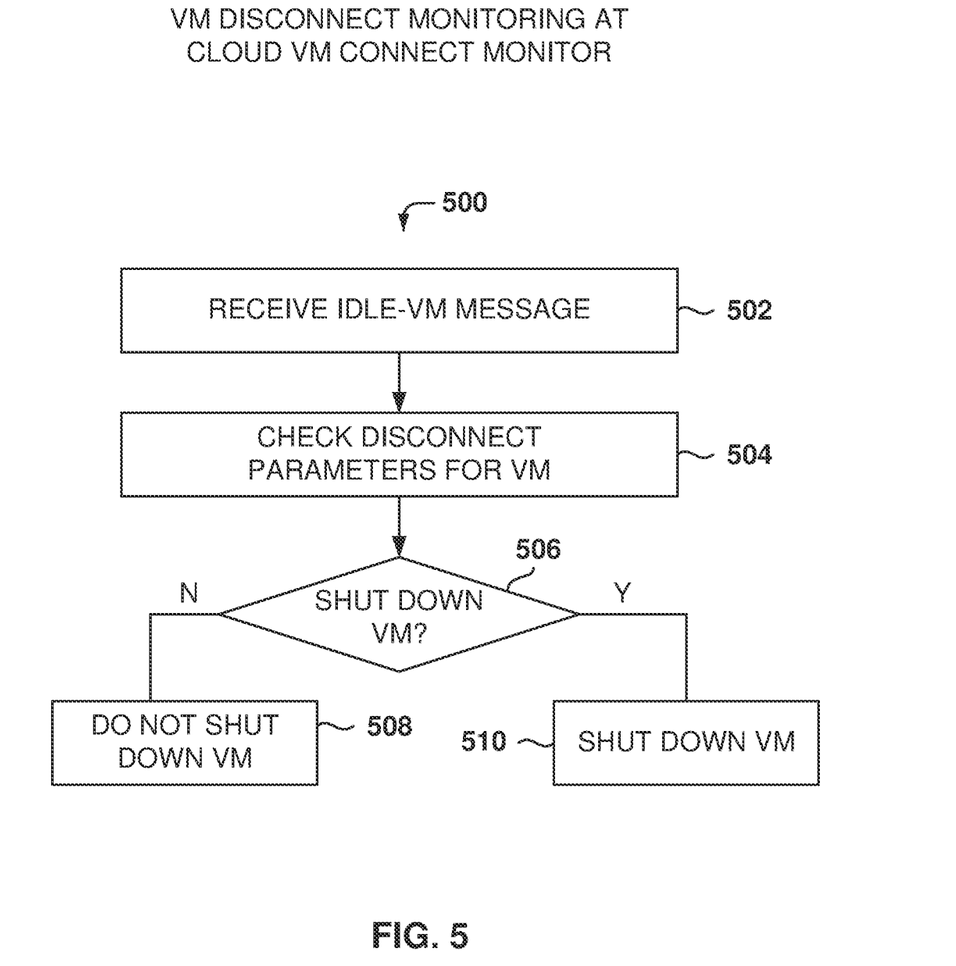
FIG. 5 is a flowchart of a method for automatically shutting down VMs without active connections, according to some example embodiments.

FIG. 5 is a flowchart of a method 500 for automatically shutting down VMs without active connections, according to some example embodiments. While the various operations in this flowchart are presented and described sequentially, one of ordinary skill will appreciate that some or all of the operations may be executed in a different order, be combined or omitted, or be executed in parallel.

The VM connect monitor 206 of the cloud-service server 202 receives the idle-VM messages and process the idle-VM messages to determine when to shut down the VMs. The VM connect monitor 206 checks the disconnect parameters 208 to determine when to shut down the VM.

The disconnect parameters 208 are similar to the disconnect rules 308 of the connect monitor 212 and may include the same rules as described above regarding number of connections, idle-time thresholds, VMs exempt from shutting down, etc. Another rule may be to simply perform the action requested in the idle-VM message, such as shutting down the VM. In some example embodiments, the connect monitor 212 does not count the inactivity time, and it is up to the VM connect monitor 206 to determine if a minimum threshold of inactivity time is required before shutting down the VM.

These rules for the VM connect monitor 206 are configurable by the system administrator, and, in some cases, by the user accessing the VM. If there is a conflict between the disconnect rules 308 and the disconnect parameters 208, the disconnect parameters take precedence, in some embodiments. The reverse is implemented in other embodiments.

At operation 502, the idle-VM message is received by the VM connect monitor 206. Further, at operation 504, the disconnect parameters for the VM are checked.

From operation 504, the method 500 flows to operation 506 where a determination is made regarding the shutting down of the VM. If the determination is to shut down the VM, the method 500 flows to operation 510, and if the determination is to not shut down the VM, the method 500 flows to operation 508, where no action is taken and the VM is not shut down.

At operation 510, the VM is shut down. For example, the VM connect monitor 206 sends a message to the VM manager to request the shutdown of the VM.

Figure 6:
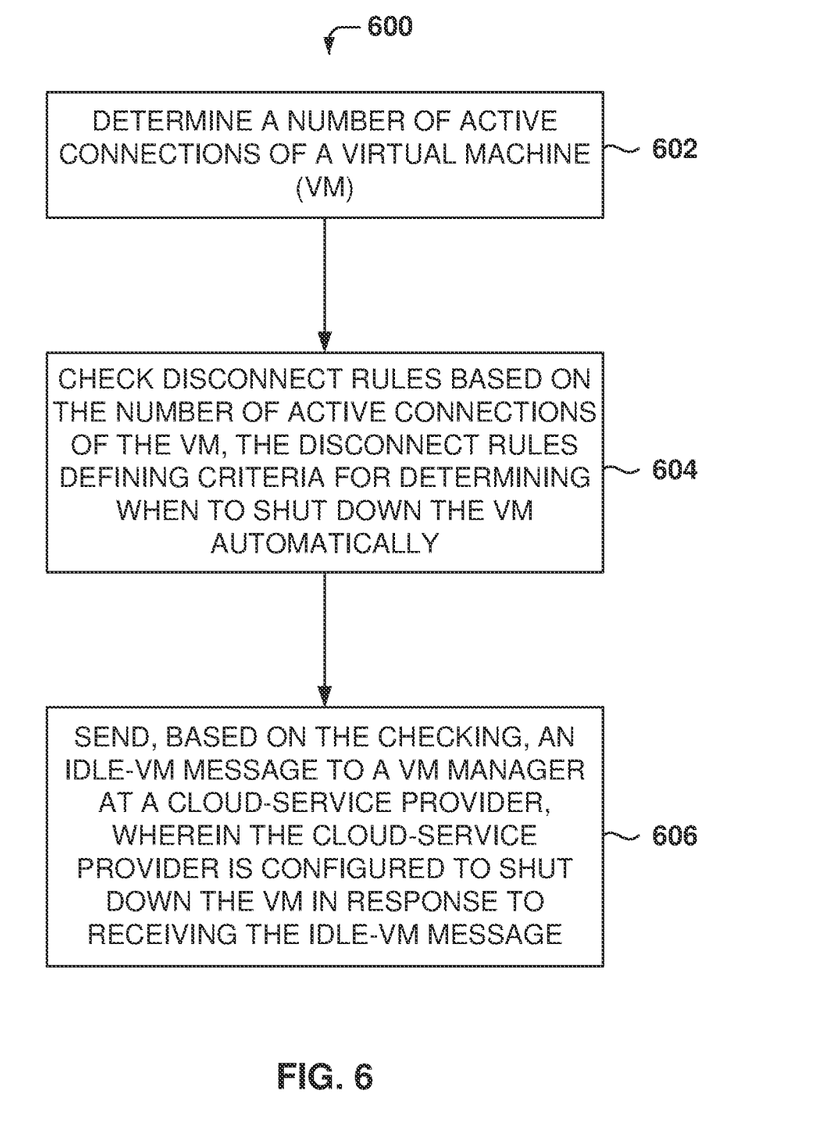
FIG. 6 is a flowchart of a method for automatically shutting down idle VMs, according to some example embodiments.

FIG. 6 is a flowchart of a method 600 for automatically shutting down idle VMs, according to some example embodiments. While the various operations in this flowchart are presented and described sequentially, one of ordinary skill will appreciate that some or all of the operations may be executed in a different order, be combined or omitted, or be executed in parallel.

Operation 602 is for determining a number of active connections of a virtual machine (VM).

From operation 602, the method 600 flows to operation 604 for checking, by the one or more processors, disconnect rules to determine automatic shutting down of the VM. The disconnect rules are based on the number of active connections of the VM, and the disconnect rules define criteria for determining when to shut down the VM automatically.

From operation 604, the method 600 flows to operation 606 for, based on determining to automatically shut down the VM, sending a message indicating the VM is inactive to a VM manager program executing at a cloud-service provider. The VM manager program is configured to shut down the VM in response to receiving the message indicating the VM is inactive.

In one example, the method 600 further comprises, for each active connection, establishing a communication channel between the VM and the another computing device.

In one example, checking disconnect rules comprises checking a disconnect rule that defines to automatically shut down the VM when a number of terminal-services connections is equal to zero, and determining to automatically shut down the VM when the number of terminal-services connections is equal to zero.

In one example, checking disconnect rules comprises checking respective rules for one or more types of active connections.

In one example, checking the disconnect rules comprises checking a threshold inactivity period, and determining to automatically shut down the VM after the VM has zero active connections for at least the threshold inactivity period.

In one example, checking the disconnect rules comprises checking a number of terminal connections, and determining to automatically shut down the VM when the number of terminal connections is below a predetermined threshold number of terminal connections.

In one example, checking the disconnect rules comprises checking a threshold number of Simple Mail Transfer Protocol (SMTP) connections, and determining to automatically shut down the VM when the number of SMTP connections is below the threshold number of SMTP connections.

In one example, checking the disconnect rules comprises checking a number of web browser tabs open, and determining to automatically shut down the VM when the number of web browser tabs open is below a predetermined threshold number of web browser tabs open.

In one example, checking the disconnect rules comprises checking an amount of time the VM is inactive, and determining to automatically shut down the VM after the VM is inactive for a minimum amount of time.

In one example, checking the disconnect rules comprises detecting that another VM is configured to not shut down due to inactivity, and avoid shutting down the other VM due to inactivity.

In one example, the cloud-service provider further comprises disconnect parameters for determining when to shut down the VM after receiving the idle-VM message.

In one example, the disconnect parameters include one or more of threshold number of terminal connections before shutting down VM, threshold number of SMTP connections before shutting down VM, threshold number of web browser tabs open before shutting down VM, minimum amount of time the VM is inactive before shutting down the VM, and VM to never be shut down due to inactivity.

In one example, the method 600 further comprises causing presentation of a user interface for configuring the disconnect rules for the VM.

Another general aspect is for a system that includes a memory comprising instructions and one or more computer processors. The instructions, when executed by the one or more computer processors, cause the one or more computer processors to perform operations comprising: determining, by a cloud-service server, a number of terminal-services connections of a virtual machine (VM) executing on the cloud-service server; checking, by the cloud-service server, disconnect rules to determine automatic shutting down of the VM, the disconnect rules based on the number of terminal-services connections of the VM, the disconnect rules defining criteria fir determining when to shut down the VM automatically; and shutting down the VM in response to automatically shut down the VM.

In yet another general aspect, a machine-readable storage medium (e.g., a non-transitory storage medium) includes instructions that, when executed by a machine, cause the machine to perform operations comprising: determining, by a cloud-service server, a number of terminal-services connections of a virtual machine (VM) executing on the cloud-service server; checking, by the cloud-service server, disconnect rules to determine automatic shutting down of the VM, the disconnect rules based on the number of terminal-services connections of the VM, the disconnect rules defining criteria for determining when to shut down the VM automatically; and shutting down the VM in response to automatically shut down the VM.

In view of the disclosure above, various examples are set forth below. It should be noted that one or more features of an example, taken in isolation or combination, should be considered within the disclosure of this application.

Figure 7:
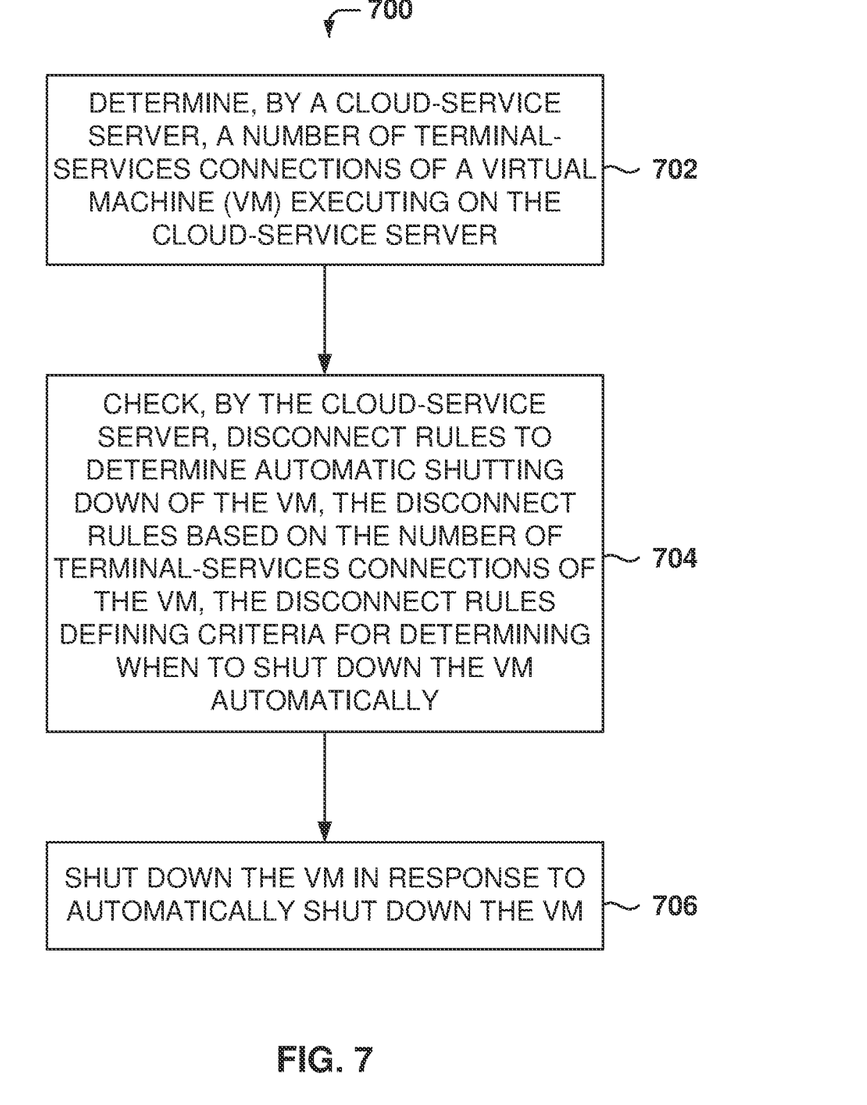
FIG. 7 is a flowchart of a method for automatically shutting down idle VMs, according to some example embodiments.

FIG. 7 is a flowchart of a method 700 for automatically shutting down idle VMs, according to some example embodiments.

Operation 702 is for determining, by a cloud-service server, a number of terminal-services connections of a virtual machine (VM) executing on the cloud-service server.

From operation 702, the method 700 flows to operation 704 to check, by the cloud-service server, disconnect rules to determine automatic shutting down of the VM. The disconnect rules are based on the number of terminal-services connections of the VM, and the disconnect rules defining criteria for determining when to shut down the VM automatically.

From operation 704, the method 700 flows to operation 706 for shutting down the VM in response to automatically shut down the VM.

In one example, each active connection is an ongoing interaction between the VM and another computing device to exchange data.

In one example, checking disconnect rules comprises checking a disconnect rule that defines to automatically shut down the VM when a number of terminal-services connections is equal to zero, and determining to automatically shut down the VM when the number of terminal-services connections is equal to zero.

In one example, checking disconnect rules comprises checking respective rules for one or more types of active connections.

In one example, checking the disconnect rules comprises checking a threshold inactivity period, and determining to automatically shut down the VM after the VM has zero active connections for at least the threshold inactivity period.

In one example, checking the disconnect rules comprises checking a number of terminal connections, and determining to automatically shut down the VM when the number of terminal connections is below a predetermined threshold number of terminal connections.

Figure 8:
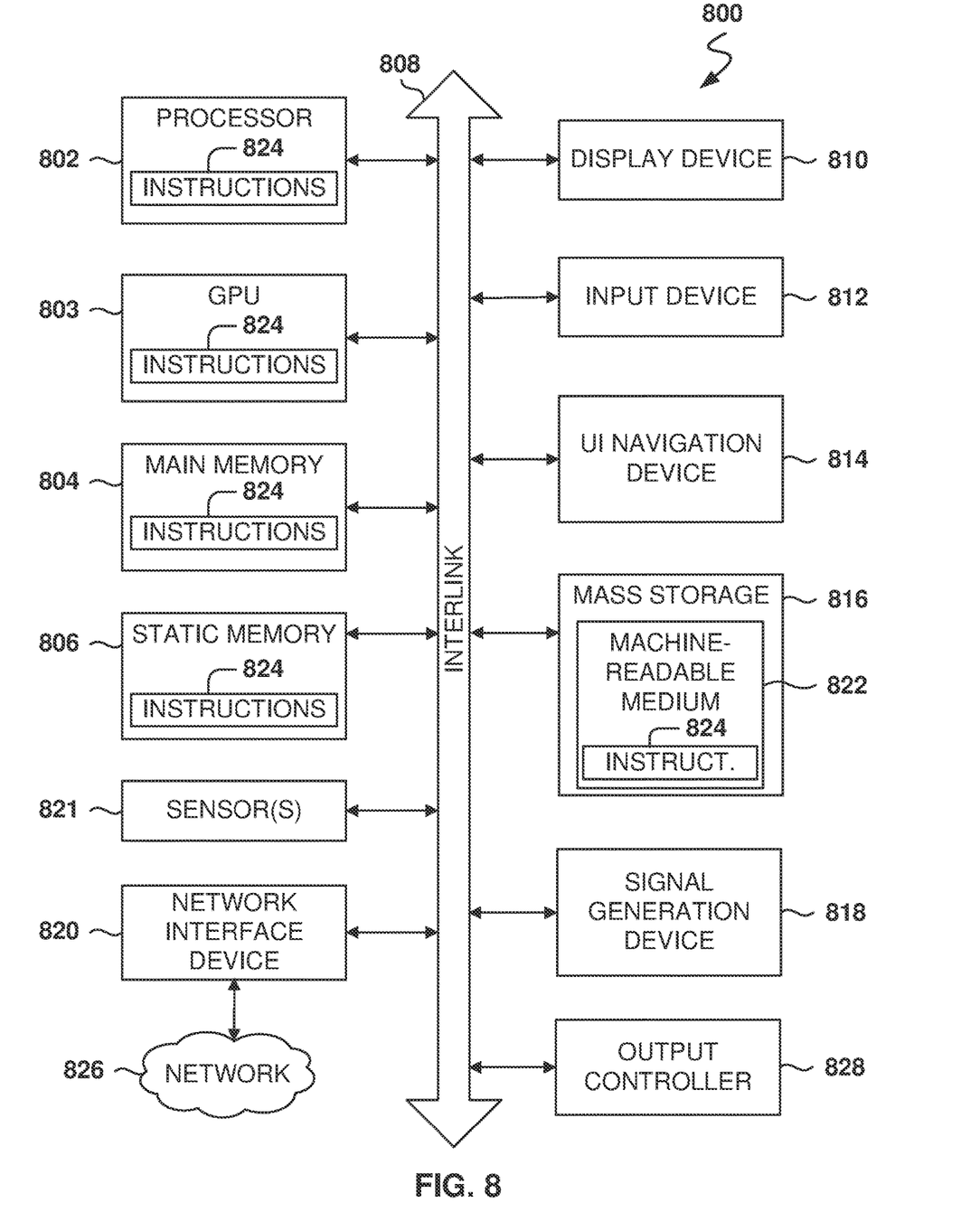
FIG. 8 is a block diagram illustrating an example of a machine upon or by which one or more example process embodiments described herein may be implemented or controlled.

FIG. 8 is a block diagram illustrating an example of a machine 800 upon or by which one or more example process embodiments described herein may be implemented or controlled. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in a peer-to-peer (P2P) (or other distributed) network environment. Further, while only a single machine 800 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components ma be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 800 may include a hardware processor 802 (e.g., a central processing unit (CPU), a hardware processor core, or any combination thereof), a graphics processing unit (GPU) 803, a main memory 804, and a static memory 806, some or all of which may communicate with each other via an interlink (e.g., bus) 808. The machine 800 may further include a display device 810, an alphanumeric input device 812 (e.g., a keyboard), and a user interface (UI) navigation device 814 (e.g., a mouse). In an example, the display device 810, alphanumeric input device 812, and UI navigation device 814 may be a touch screen display. The machine 800 may additionally include a mass storage device (e.g., drive unit) 816, a signal generation device 818 (e.g., a speaker), a network interface device 820, and one or more sensors 821, such as a Global Positioning System (GPS) sensor, compass, accelerometer, or another sensor. The machine 800 may include an output controller 828, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 816 may include a machine-readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, within the hardware processor 802, or within the GPU 803 during execution thereof by the machine 800. In an example, one or any combination of the hardware processor 802, the GPU 803, the main memory 804, the static memory 806, or the mass storage device 816 may constitute machine-readable media.

While the machine-readable medium 822 is illustrated as a single medium, the term "machine-readable medium" may include a single medium, or multiple media, (e.g., a centralized or distributed database, and/or associated caches and servers) configured to store the one or more instructions 824.

The term "machine-readable medium" may include any medium that is capable of storing, encoding, or carrying instructions 824 for execution by the machine 800 and that cause the machine 800 to perform any one or more of the techniques of the present disclosure, or that is capable of storing, encoding, or carrying data structures used by or associated with such instructions 824. Non-limiting machine-readable medium examples may include solid-state memories, and optical and magnetic media. In an example, a massed machine-readable medium comprises a machine-readable medium 822 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
    determining, at a connect monitor in a virtual machine operated by one or more processors of a cloud-service server, a number of active connections of the virtual machine (VM), the VM being executed on the cloud-service server;
    checking at the connect monitor in the VM, disconnect rules in the VM, the disconnect rules based on the number of active connections of the VM, the disconnect rules defining criteria for determining when to shut down the VM automatically;
    determining, at the connect monitor in the VM, to automatically shut down the VM based on the disconnect rules in the VM;
    based on determining to automatically shut down the VM, generating, at the connect monitor in the VM, a message indicating the VM is inactive and sending the message to a VM manager program executing outside of the VM at the cloud-service server, wherein the VM manager program process the message, identify separately predetermined disconnect parameters, in the VM manager program, at the cloud-service server, and selectively shut down the VM based on the disconnect rules and the disconnect parameters.

2. The method as recited in claim 1, wherein each active connection is an ongoing interaction between the VM and another computing device to exchange data.

3. The method as recited in claim 2, further comprising:
    for each active connection, establishing a communication channel between the VM and the another computing device.

4. The method as recited in claim 1, wherein checking the disconnect rules comprises:
    checking a disconnect rule that defines to automatically shut down the VM when a number of terminal-services connections is equal to zero; and
    determining to automatically shut down the VM when the number of terminal-services connections is equal to zero.

5. The method as recited in claim 1, wherein checking the disconnect rules comprises:
    checking respective rules for one or more types of active connections.

6. The method as recited in claim 1, wherein checking the disconnect rules comprises:
    checking a threshold inactivity period; and
    determining to automatically shut down the VM after the VM has zero active connections for at least the threshold inactivity period.

7. The method as recited in claim 1, wherein checking the disconnect rules comprises:
    checking a number of terminal connections; and
    determining to automatically shut down the VM when the number of terminal connections is below a predetermined threshold number of terminal connections.

8. The method as recited in claim 1, wherein checking the disconnect rules comprises:
    checking a threshold number of Simple Mail Transfer Protocol (SMTP) connections; and
    determining to automatically shut down the VM when the number of SMTP connections is below the threshold number of SMTP connections.

9. The method as recited in claim 1, wherein checking the disconnect rules comprises:
    checking a number of web browser tabs open; and
    determining to automatically shut down the VM when the number of web browser tabs open is below a predetermined threshold number of web browser tabs open.

10. The method as recited in claim 1, wherein checking the disconnect rules comprises:
    checking an amount of time the VM is inactive; and
    determining to automatically shut down the VM after the VM is inactive for a minimum amount of time.

11. The method as recited in claim 1, wherein checking the disconnect rules comprises:

detecting that another VM is configured to not shut down due to inactivity; and avoid shutting down the other VM due to inactivity.

12. The method as recited in claim 1, wherein the VM manager program determines a conflict between the disconnect rules and the disconnect parameters and shuts down the VM based on the disconnect parameters instead of the disconnect rules.

13. The method as recited in claim 12, wherein the disconnect parameters include one or more of threshold number of terminal connections before shutting down VM, threshold number of SMTP connections before shutting down VM, threshold number of web browser tabs open before shutting down VM, minimum amount of time the VM is inactive before shutting down the VM, and VM to not be shut down due to inactivity.

14. A system comprising: a memory comprising instructions; and one or more computer processors, wherein the instructions, when executed by the one or more computer processors, cause the system to perform operations comprising:

determining, at a connect monitor in a virtual machine operated by one or more processors of a cloud-service server, a number of active connections of the virtual machine (VM), the VM being executed on the cloud-service server;

checking, at the connect monitor in the VM, disconnect rules in the VM, the disconnect rules based on the number of active connections of the VM, the disconnect rules defining criteria for determining when to shut down the VM automatically;

determining, at the connect monitor in the VM, to automatically shut down the VM based on the disconnect rules in the VM;

based on determining to automatically shut down the VM, generating, at the connect monitor in the VM, a message indicating the VM is inactive and sending the message to a VM manager program executing outside of the VM at the cloud-service server, wherein the VM manager program process the message, identify separately predetermined disconnect parameters, in the VM manager program, at the cloud-service server, and selectively shut down the VM based on the disconnect rules and the disconnect parameters.

15. A non-transitory machine-readable storage medium including instructions that, when executed by a machine, cause the machine to perform operations comprising:

determining, at a connect monitor in a virtual machine operated by one or more processors of a cloud-service server, a number of active connections of the virtual machine (VM), the VM being executed on the cloud-service server;

checking, at the connect monitor in the VM, disconnect rules in the VM, the disconnect rules based on the number of active connections of the VM, the disconnect rules defining criteria for determining when to shut down the VM automatically;

determining, at the connect monitor in the VM, to automatically shut down the VM based on the disconnect rules in the VM; and based on determining to automatically shut down the VM, generating, at the connect monitor in the VM, a message indicating the VM is inactive and sending the message to a VM manager program executing outside of the VM at the cloud-service server, wherein the VM manager program is configured to process the message, identify separately predetermined disconnect parameters, in the VM manager program, at the cloud-service server, and selectively shut down the VM based on the disconnect rules and the disconnect parameters.

16. The tangible machine-readable storage medium as recited in claim 15, wherein each active connection is an ongoing interaction between the VM and another computing device to exchange data.

17. The tangible machine-readable storage medium as recited in claim 15, wherein checking the disconnect rules comprises:

checking a disconnect rule that defines to automatically shut down the VM when a number of terminal-services connections is equal to zero; and determining to automatically shut down the VM when the number of terminal-services connections is equal to zero.

18. The tangible machine-readable storage medium as recited in claim 15, wherein checking the disconnect rules comprises:

checking respective rules for one or more types of active connections.

19. The tangible machine-readable storage medium as recited in claim 15, wherein checking the disconnect rules comprises:

checking a threshold inactivity period; and determining to automatically shut down the VM after the VM has zero active connections for at least the threshold inactivity period.

20. The tangible machine-readable storage medium as recited in claim 15, wherein checking the disconnect rules comprises:

checking a number of terminal connections; and determining to automatically shut down the VM when the number of terminal connections is below a predetermined threshold number of terminal connections.

* * * * *